(12) United States Patent
Miyata (10) Patent No.: US 10,291,798 B2
(45) Date of Patent: May 14, 2019

(54) PASSWORD ENTRY DEVICE AND IMAGE PROCESSING APPARATUS

(71) Applicant: KYOCERA Document Solutions Inc., Osaka-shi, Osaka (JP)

(72) Inventor: Rie Miyata, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 0 days.

(21) Appl. No.: 15/698,655

(22) Filed: Sep. 8, 2017

(65) Prior Publication Data

US 2018/0077302 A1 Mar. 15, 2018

(30) Foreign Application Priority Data

Sep. 15, 2016 (JP) .................................. 2016-180879

(51) Int. Cl.
*H04N 1/00* (2006.01)
*G03G 15/00* (2006.01)
(Continued)

(52) U.S. Cl.
CPC ....... *H04N 1/00411* (2013.01); *G03G 15/502* (2013.01); *G03G 15/5016* (2013.01);
(Continued)

(58) Field of Classification Search
CPC .......... H04N 1/00411; H04N 1/00474; H04N 1/00424; H04N 1/4413; H04N 2201/0094;
(Continued)

(56) References Cited

U.S. PATENT DOCUMENTS

| | | | | |
|---|---|---|---|---|
| 2007/0220269 A1* | 9/2007 | Suzuki | ................. | H04N 1/0097 713/182 |
| 2011/0191856 A1* | 8/2011 | Keen | ....................... | G06F 21/32 726/26 |

(Continued)

FOREIGN PATENT DOCUMENTS

| | | |
|---|---|---|
| JP | 2006244048 A | 9/2006 |
| JP | 2012-089101 A | 5/2012 |
| JP | 2012108796 A | 6/2012 |

OTHER PUBLICATIONS

The extended European Search Report based on Application No. 17189316.7 dated Jan. 25, 2018, 7 pages (Reference Purpose Only).
(Continued)

*Primary Examiner* — David M. Gray
*Assistant Examiner* — Laura Roth
(74) *Attorney, Agent, or Firm* — Viering, Jentschura & Partner mbB (57) ABSTRACT

The password entry device includes a first display control unit, a tap determination unit, a second display control unit, and a password-entry acceptance unit. The tap determination unit determines which of the characters displayed in the first style by the first display control unit have been tapped. The second display control unit performs control operations to display the characters, which are determined by the tap determination unit that they were tapped, in a second area, which differs from the first area of the touch panel, in a second style, which differs from the first style. The password-entry acceptance unit accepts the entry of the characters that make up the password with the characters displayed in the second style by the second display control unit.

9 Claims, 7 Drawing Sheets

(51) Int. Cl.
*H04N 1/44* (2006.01)
*G06F 21/36* (2013.01)
*G03G 21/02* (2006.01)

(52) U.S. Cl.
CPC ......... *G03G 15/5091* (2013.01); *G06F 21/36* (2013.01); *H04N 1/00424* (2013.01); *H04N 1/00474* (2013.01); *H04N 1/4413* (2013.01); *G03G 21/02* (2013.01); *H04N 2201/0094* (2013.01)

(58) Field of Classification Search
CPC .. G03G 21/02; G03G 15/5016; G03G 15/502; G03G 15/5091; G06F 21/36
See application file for complete search history.

(56) References Cited

U.S. PATENT DOCUMENTS

| | | |
|---|---|---|
| 2012/0068935 A1 | 3/2012 | Mutoh et al. |
| 2012/0291123 A1* | 11/2012 | Qian ................ G06F 21/36 726/19 |
| 2013/0159196 A1 | 6/2013 | DiZoglio |
| 2014/0013408 A1 | 1/2014 | Ryu |
| 2014/0289843 A1* | 9/2014 | Chiang ............. G06F 3/04883 726/19 |
| 2015/0101040 A1 | 4/2015 | Hayashi |
| 2016/0182761 A1 | 6/2016 | Tobinaga |

OTHER PUBLICATIONS

Office Action issued in the counterpart Japanese Patent Application No. 2016-180879 dated Jan. 15, 2019, 4 pages and 3 pages of English Machine Translation (Reference Purpose Only).

* cited by examiner

PASSWORD ENTRY DEVICE AND IMAGE PROCESSING APPARATUS

CROSS REFERENCE TO RELATED APPLICATIONS

This application claims priority to Japanese Patent Application No. 2016-180879, which was filed Sep. 15, 2016, and is incorporated herein by reference in its entirety.

BACKGROUND

The present disclosure relates to a password entry device and an image processing apparatus.

Image processing apparatuses, typified by multifunction peripherals, read an image of an original document by using an image reading unit, and then emit light to a photoreceptor in an image forming unit based on the read image to form an electrostatic latent image on the photoreceptor. Then, the image processing apparatuses apply charged toner onto the formed electrostatic latent image to make it into a visible image that is in turn transferred onto a sheet of paper and fixed, and eject the sheet outside the image processing apparatuses.

There are some information processing apparatuses, including image processing apparatuses and computers, that permit only specific users who are authenticated through login authentication to use or operate specific functions of the information processing apparatuses. The specific users are determined by verifying a password entered by each of the users using a keyboard or other input devices against registered passwords. Some techniques relating information input devices to enter passwords are conventionally well known.

A typical information input device includes a display means that displays an information input screen through which information is input, and an input means that is arranged over the display means and locates specified positions on the image input screen. The information input device is characterized in that the display means displays a first screen when a predetermined key is pressed. The first screen contains a predetermined area including at least one of a character, a symbol, and a figure. The information input device is also characterized in that the display means displays a second screen when the input means locates a position in the predetermined area, and the predetermined area does not indicate information about the transition to the second screen.

SUMMARY

In one aspect of the present disclosure, the password entry device is a device through which a password is entered. The password entry device includes a touch panel displaying information, a first display control unit, a tap determination unit, a second display control unit, and a password-entry acceptance unit. The first display control unit performs control operations to display a plurality of characters including characters that make up a password in a first area of the touch panel in a first style for representing characters. The tap determination unit determines which of the characters displayed in the first style by the first display control unit have been tapped. The second display control unit performs control operations to display the characters, which are determined by the tap determination unit that they were tapped, in a second area, which differs from the first area of the touch panel, in a second style, which differs from the first style. The password-entry acceptance unit accepts the entry of the characters that make up the password with the characters displayed in the second style by the second display control unit.

In another aspect of the present disclosure, the image processing apparatus performs image processing. The image processing apparatus includes an image processing unit performing image processing, a password entry device through which a password is entered, a password authentication unit, and an operation unit. The password authentication unit authenticates passwords input into the password entry device. The operation unit permits input of information relating to image processing if the password authentication by the password authentication unit succeeds. The password entry device includes a touch panel displaying information, a first display control unit, a tap determination unit, a second display control unit, and a password-entry acceptance unit. The first display control unit performs control operations to display a plurality of characters including characters that make up a password in a first area of the touch panel in a first style for representing characters. The tap determination unit determines which of the characters displayed in the first style by the first display control unit have been tapped. The second display control unit performs control operations to display the characters, which are determined by the tap determination unit that they were tapped, in a second area, which differs from the first area of the touch panel, in a second style, which differs from the first style. The password-entry acceptance unit accepts the entry of the characters that make up the password with the characters displayed in the second style by the second display control unit.

DETAILED DESCRIPTION

Figure 1:
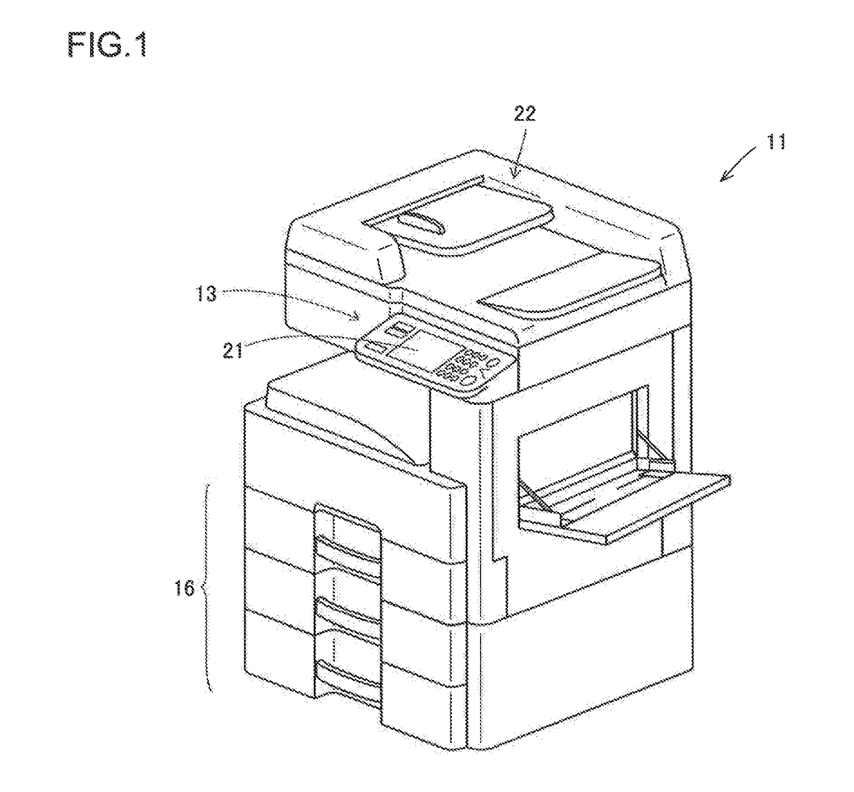
FIG. 1 illustrates a multifunction peripheral to which an image forming apparatus according to an embodiment of the present disclosure is applied.
Figure 2:
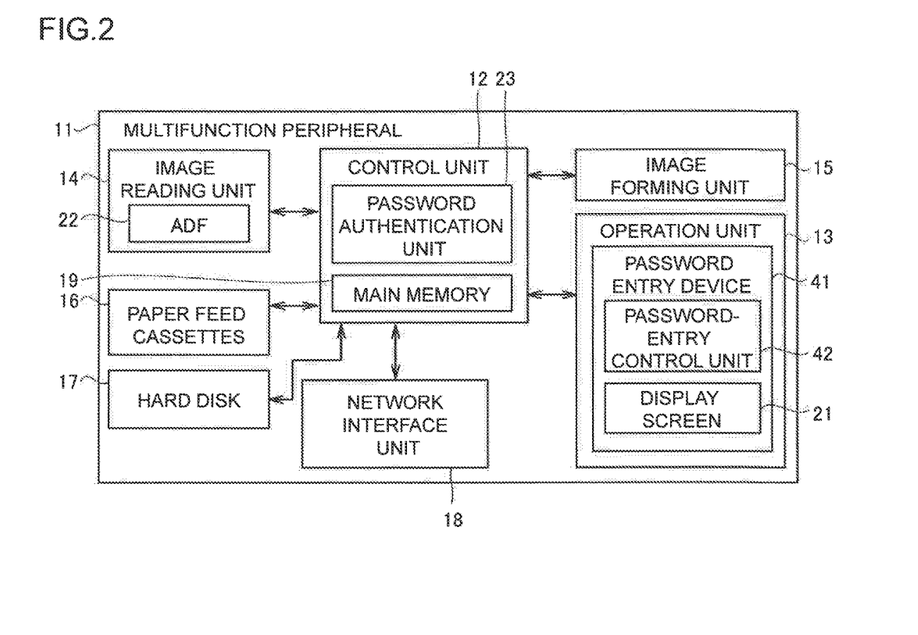
FIG. 2 is a block diagram showing the configuration of the multifunction peripheral shown in FIG. 1.

Embodiments of the present disclosure will be described below. FIG. 1 is a schematic external view of a multifunction peripheral to which an image processing apparatus including a password entry device according to an embodiment of the present disclosure is applied. FIG. 2 is a block diagram showing the configuration of the multifunction peripheral shown in FIG. 1.

Referring to FIGS. 1 and 2, the multifunction peripheral 11 has a plurality of functions relating to image processing, such as a copying function, a printer function, and a facsimile function. The multifunction peripheral 11 includes a control unit 12, an operation unit 13, an image reading unit 14, an image forming unit 15, paper feed cassettes 16, a hard disk 17, and a network interface unit 18 used to connect with the network (not shown).

The control unit 12 controls the entire multifunction peripheral 11. The control unit 12 is a CPU or the like, and includes a main memory 19 that temporarily stores data. The operation unit 13 includes a touch panel 21 that serves as a display screen displaying information submitted from the multifunction peripheral 11 and entries made by users. The operation unit 13 accepts input of information relating to image formation, such as image forming conditions including the number of copies and gradation degrees, from users. The operation unit 13 includes a password entry device 41 through which passwords are entered. Note that the touch panel 21 is also included in the password entry device 41. The image reading unit 14 includes an auto document feeder (ADF) 22 serving as a document transporting device that transports an original document placed on a loading position to a reading position. The image reading unit 14 reads an image of the original document loaded in the ADF 22 or placed on a document table (not shown). Each of the paper feed cassettes 16 can hold a plurality of sheets of paper. The image forming unit 15 forms an image on paper transported from the paper feed cassettes 16 based on image data of the original document read by the image reading unit 14 or image data transmitted via the network. The hard disk 17 stores data relating to image formation, that is, the transmitted image data, the input image forming conditions, password data used for password authentication, and so on.

The control unit 12 includes a password authentication unit 23 that authenticates passwords received by a password entry device 41, more specifically, a password-entry acceptance unit 46, both of which will be described later. The password authentication unit 23 verifies a password entered through the password entry device 41 against a password associated with an ID, which will be described later, and stored in the hard disk 17 to perform password authentication. If the password authentication succeeds, or specifically speaking, if the passwords match each other, subsequent operations using the operation unit 13 are approved. If the password authentication fails, or specifically speaking, if the passwords do not match each other, subsequent operations using the operation unit 13 are disapproved. In short, the operation unit 13 permits input of information relating to image processing after the password authentication unit 23 authenticates the password.

The multifunction peripheral 11 is connectable to various external devices through the network interface unit 18. Specifically, the multifunction peripheral 11 can be connected to a computer, a tablet terminal, an external memory device, a server, and so on through the network (not shown).

Figure 3:
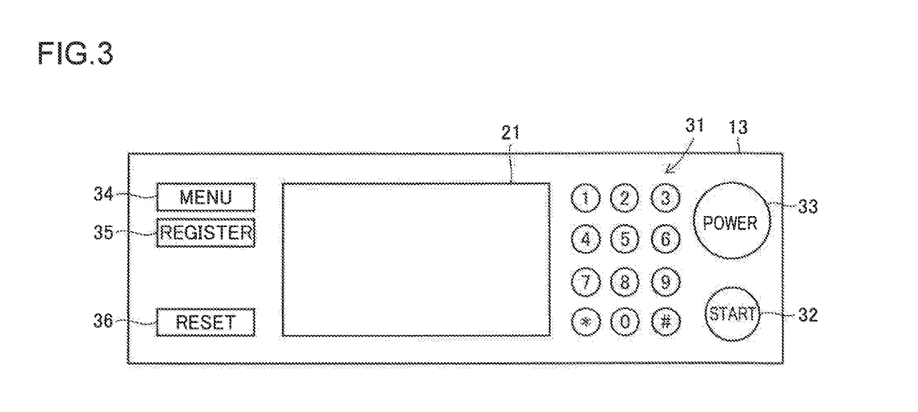
FIG. 3 illustrates the configuration of an operation unit.

Next, the configuration of the aforementioned operation unit 13 will be described in further detail. FIG. 3 is an external view schematically showing the configuration of the operation unit 13. Referring to FIG. 3, the operation unit 13 includes numeric keys 31 including number keys 0 to 9 used by users to input the number of copies or the like and symbol keys like "*" and "#", a start key 32 used to provide instructions to start printing and to send a fax, a power key 33 used to turn on and off the power source of the multifunction peripheral 11, a menu key 34 used to provide instructions to select one of the functions, such as a printer function or a copying function, of the multifunction peripheral 11, a register key 35 used to provide instructions to register various image forming conditions and user information, a reset key 36 used to cancel the instructions input by users with the numeric keys 31 and the other keys, and the aforementioned touch panel 21. The touch panel 21 is a liquid crystal display with a touch panel function. Users can input image forming conditions and other types of information and also can select various functions by tapping the touch panel 21 with their fingers.

Next, the configuration of the password entry device 41 will be described. The password entry device 41 includes a password-entry control unit 42 that controls the password entry device 41, and the aforementioned touch panel 21.

Figure 4:
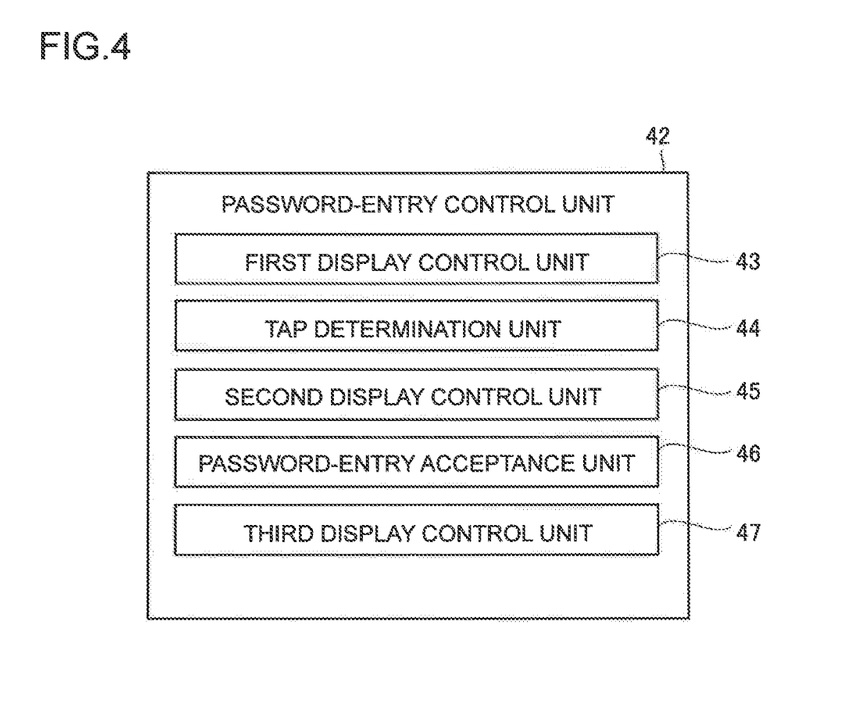
FIG. 4 is a block diagram showing the configuration of a password-entry control unit.

FIG. 4 is a block diagram showing the configuration of the password-entry control unit 42. Referring to FIG. 4, the password-entry control unit 42 includes a first display control unit 43, a tap determination unit 44, a second display control unit 45, and a password-entry acceptance unit 46. The first display control unit 43 performs control operations to display a plurality of characters including characters that make up a password in a first area of the touch panel in a first style for representing characters. The tap determination unit 44 determines which of the characters displayed in the first style by the first display control unit 43 have been tapped. The second display control unit 45 performs control operations to display the characters, which are determined by the tap determination unit 44 that they were tapped, in a second area, which differs from the first area of the touch panel 21, in a second style, which differs from the first style. The password-entry acceptance unit 46 accepts the entry of the characters that make up the password with the characters displayed in the second style by the second display control unit 45. The configuration of these units will be described later in detail.

The following description presents a password entry process using the multifunction peripheral 11. If the entered password is successfully authenticated, the multifunction peripheral 11 allows the operation unit 13 to accept the input of operation details, and thus can perform printing or other image forming operations with the image forming unit 15.

Figure 5:
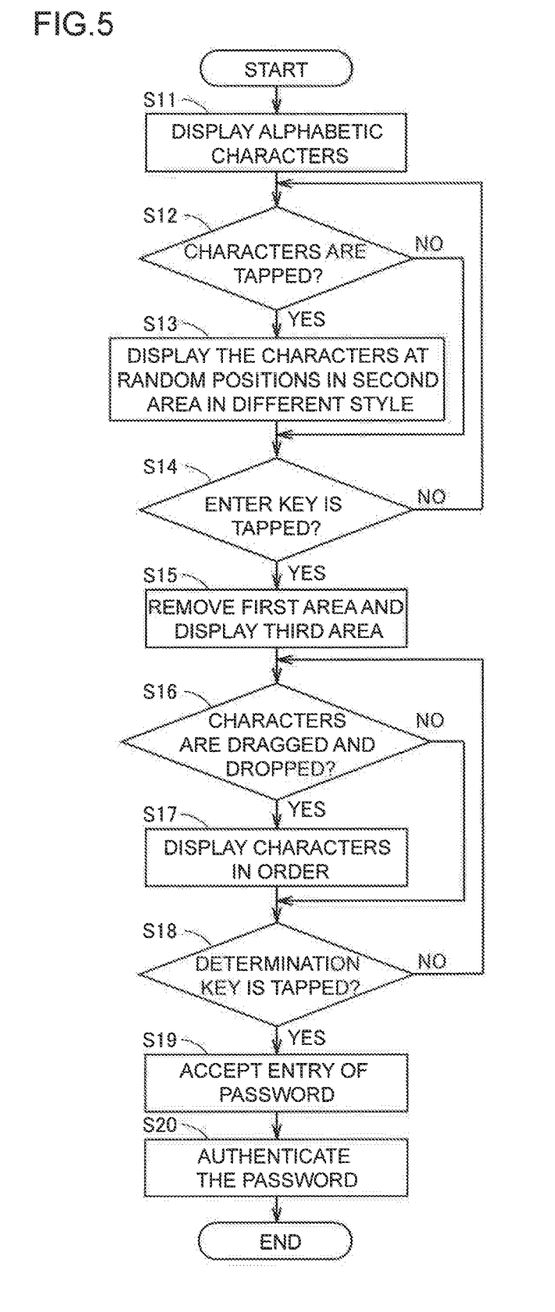
FIG. 5 is a flowchart of a password entry process.

FIG. 5 is a flowchart of the password entry process. Referring to FIG. 5, in response to a password entry request, the first display control unit 43 performs control operations to display a plurality of characters including characters that make up a password in a first area of the touch panel 21 in a first style for representing characters (step S11 in FIG. 5, hereinafter, "step" is omitted).

Figure 6:
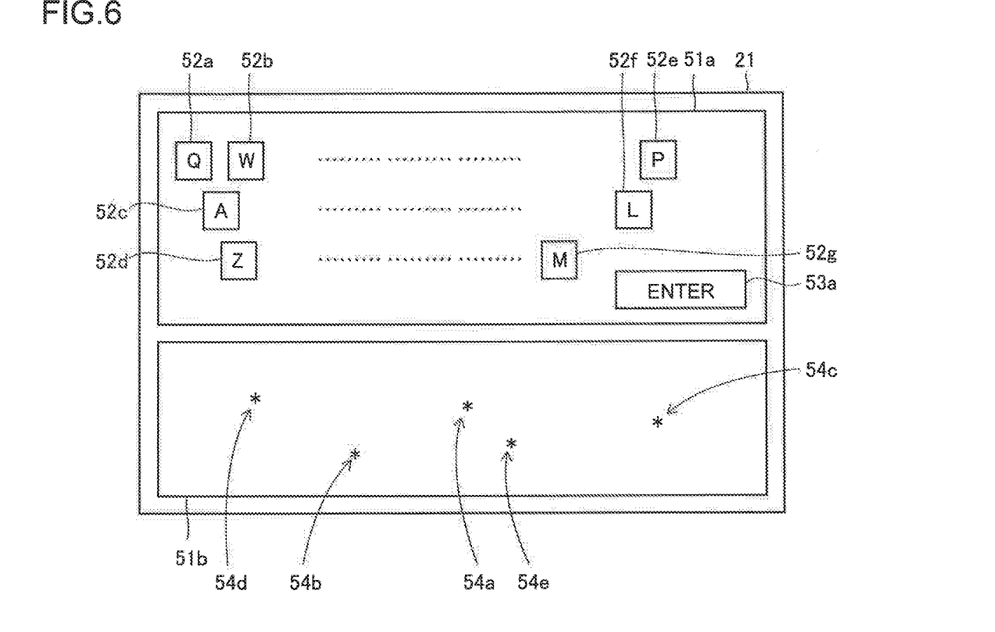
FIG. 6 shows an exemplary screen of a touch panel with a plurality of characters including characters that make up a password displayed in a first area in a first style.

FIG. 6 shows an exemplary screen of the touch panel 21 with the characters including the characters that make up passwords displayed in the first style. In this example, alphabetic characters are displayed in the first area of the touch panel 21. Referring to FIG. 6, the touch panel 21 displays a first area 51a and a second area 51b. The first area 51a takes up an upper part of the touch panel 21, and is slightly larger than a half of the touch panel 21. The second area 51b is arranged below the first area 51a. These two areas 51a, 51b occupy most of the area of the touch panel 21.

In the first area 51a, there are a plurality of alphabetic characters 52a, 52b, 52c, 52d, 52e, 52f, 52g that make up passwords and are represented in the first style. Specifically, the character 52a corresponds to an alphabet letter "Q", the character 52b corresponds to an alphabet letter "W", the character 52c corresponds to an alphabet letter "A", the character 52d corresponds to an alphabet letter "Z", the character 52e corresponds to an alphabet letter "P", the character 52f corresponds to an alphabet letter "L", and the character 52g corresponds to an alphabet letter "M". In this example, the first style is to display alphabet letters corresponding to the characters 52a to 52g without any alterations. Note that other characters that make up passwords are omitted in FIG. 6. Additionally, an enter key 53 is also displayed in the first area 51a. The enter key 53 is used to confirm that characters that make up a password have been selected from the characters 52a to 52g by tapping them.

A user taps the characters that make up a password. For instance, if the password is "QWAZP", the user taps the corresponding characters 52a to 52e. The order of tapping the characters 52a to 52e is not particularly restricted. This means that the user can tap the characters in the order of the character 52a, character 52c, character 52d, character 52b, and character 52e, or in the order of the character 52e, character 52c, character 52a, character 52d, and character 52b.

The tap determination unit 44 determines which of the characters 52a to 52g displayed in the first style by the first display control unit 43 have been tapped (S12). If some of the characters 52a to 52g have been tapped (YES in S12), the second display control unit 45 performs control operations to display the characters determined that they were tapped by the tap determination unit 44, in a second area 51b, which differs from the first area 51a of the touch panel 21, in a second style, which differs from the first style (S13). In this example, the second style is to display asterisk symbols "*" for the tapped characters.

Referring again to FIG. 6, the symbols 54a, 54b, 54c, 54d, 54e represented by asterisks are displayed in the second area 51b. The symbol 54a is displayed when the character 52a is tapped and corresponds to an alphabet letter "Q". The symbol 54b is displayed when the character 52b is tapped and corresponds to an alphabet letter "W". The symbol 54c is displayed when the character 52c is tapped and corresponds to an alphabet letter "A". The symbol 54d is displayed when the character 52d is tapped and corresponds to an alphabet letter "Z". The symbol 54e is displayed when the character 52e is tapped and corresponds to an alphabet letter "P". The symbols 54a to 54e are placed randomly, but they are spaced apart from one another so as not to overlap.

Since only the asterisk symbols 54a to 54e are displayed in the second area 51b, a third party cannot figure out which symbols 54a to 54e correspond to which characters 52a to 52e, or which alphabet letters, from the representation in the second area 51b. However, the user who entered the password remembers the positions of the asterisk symbols 54a to 54e appearing when the characters 52a to 52e were tapped individually, and therefore can recognize which symbols 54a to 54e correspond to which characters 52a to 52e.

Subsequently, it is determined whether the enter key 53a has been tapped (S14). Until the enter key 53a is tapped (NO in S14), the characters 52a to 52g are tapped one after another, and the corresponding symbols are displayed successively in the second area 51b.

Figure 7:
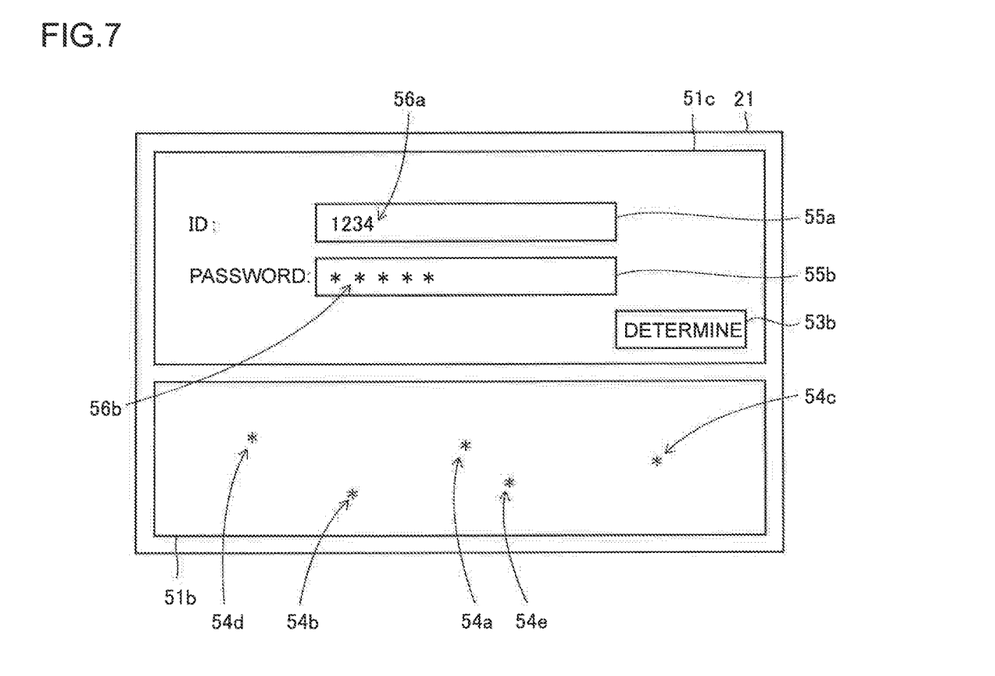
FIG. 7 shows an exemplary screen of the touch panel with a third area displayed.

If the enter key 53a is tapped (YES in S14), the touch panel 21 shows the next screen. In this example, a third display control unit 47 performs control operations to display a third area 51c on the touch panel 21. The third area displays the characters that are selected from the characters represented in the second style and make up the password. More specifically, the third display control unit 47 removes the first area 51a from the touch panel 21 and displays the third area 51c at the position where the first area 51a was presented (S15). The second area 51b remains as it is. The symbols 54a to 54e of course remain at the same positions.

FIG. 7 shows an exemplary screen of the touch panel 21 with the third area 51c displayed. Referring to FIG. 7, the touch panel 21 displays the third area 51c and the second area 51b. The representation in the second area 51b is the same as that shown in FIG. 6. This means that the symbols 54a to 54e are displayed at the same positions in the second area 51b as those shown in FIG. 6.

The size and shape of the third area 51c are almost the same as the first area 51a. The third area 51c includes an ID entry field 55a through which an ID, or an identification mark unique to each user who performs password authentication is input, a password entry field 55b in which a password is input, and a determination key 53b that is tapped to determine the input password.

The user enters an ID 56a assigned to the user in the ID entry field 55a. In this example, the user types numeric value "1234", which is the ID 56a assigned to the user, using the numeric keypad 31 or other input devices.

On the other hand, the input of the password in the password entry field 55b is carried out by dragging and dropping the symbols 54a to 54e from the second area 51b to the password entry field 55b. Specifically, the user drags and drops the symbols 54a to 54e, which correspond to the characters 52a to 52e that make up the password and are displayed in the second area 51b, one by one using his/her finger into the password entry field 55b (S16).

The symbols 54a to 54e corresponding to the characters 52a to 52e that make up the password are input one by one in the password entry field 55b using drag and drop with the user's finger. Then, the symbols 54a to 54e appear in the password entry field 55b in order, and consequently the password 56b is entered (S17). Since the password is represented by all the asterisk symbols 54a to 54e, a third party cannot figure out which of the alphabetic characters make up the password. However, the user who entered the password remembers the positions of the symbols 54a to 54e that appear upon tapping of the characters 52a to 52e, and recognizes the characters 52a to 52e corresponding to the symbols 54a to 54e, thereby entering the password without mistakes.

After completing the entry of the password, the user taps the determination key 53b (YES in S18). When detecting the tapping of the determination key 53b, the password-entry acceptance unit 46 accepts the entry of the characters that make up the password with the symbols 54a to 54e which are displayed in the second style by the second display control unit 45. Specifically, the password-entry acceptance unit 46 accepts the entry of the password with the symbols 54a to 54e that are dragged and dropped from the second area 51b to the third area 51c, or more specifically to the password entry field 55b (S19). Then, the password authentication unit 23 performs password authentication (S20). If the password authentication succeeds, the touch panel 21 displays information from the multifunction peripheral 11 and allows the user to enter information. Therefore, the user who has been authenticated successfully with the password can use the functions, including the copy function, of the multifunction peripheral 11. On the other hand, if the password authentication fails, the user cannot operate the multifunction peripheral 11 for copying or other transactions.

According to the above-described configuration, among the characters 52a to 52g displayed in the first style, the tapped characters 52a to 52e are displayed in the second area 51b in the second style which differs from the first style. Then, the characters displayed in the second area 51b in the second style are used as the characters that make up the password, and are accepted. This configuration can reduce the possibility that the password to be entered is read surreptitiously, because differently styled characters are selected to enter the password. Thus, password entry security can be improved.

Also the multifunction peripheral 11 can provide improved password entry security.

In this example, the second display control unit 45 performs control operations to display the symbols 54a to 54e to be all the same symbols in the second style, thereby further improving security.

In the above-described embodiment, the second display control unit 45 can be configured to display the symbols 54a to 54e in the first style for a predetermined period of time, in other words, the second display control unit 45 can be configured to change the symbols 54a to 54e into the alphabetic characters 52a to 52e for a predetermined period of time, when detecting a predetermined gesture, for example, double-tapping on the symbols 54a to 54e.

Figure 8:
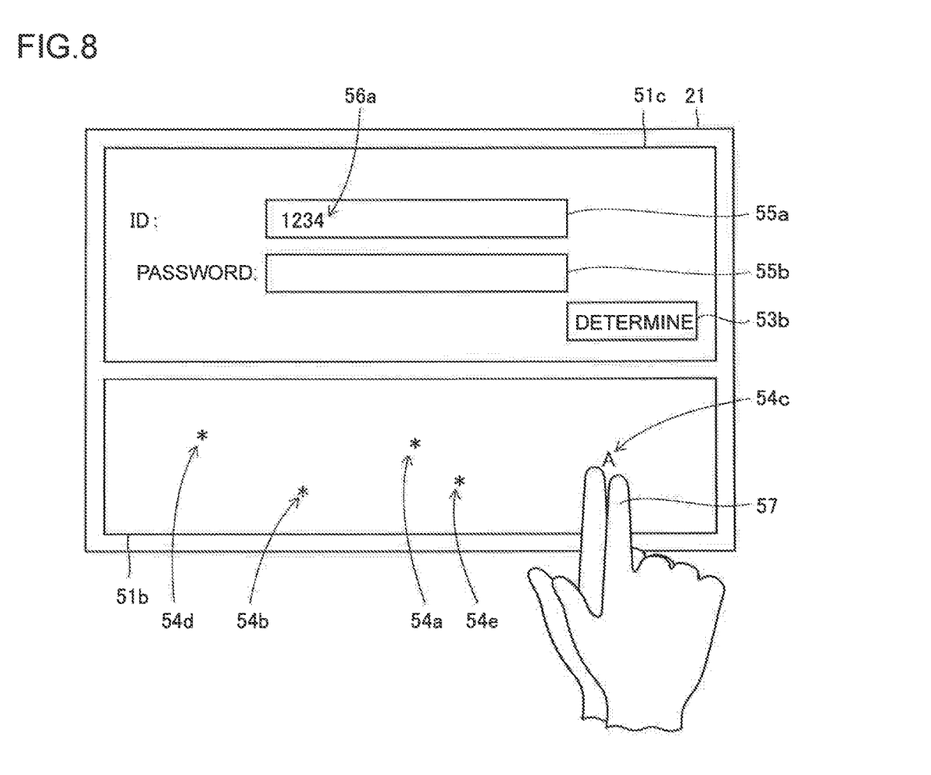
FIG. 8 shows an exemplary screen of the touch panel with symbols double-tapped.

FIG. 8 is an exemplary screen of the touch panel 21 with the symbol 54c double-tapped. Referring to FIG. 8, when the user double-taps the symbol 54c with his/her finger 57, the character 52c corresponding to the symbol 54c, in this example, an alphabet letter "A" appears for a certain period of time, more specifically, for example, for only a few seconds. This configuration helps the user who fails to remember or forgets the character 52c corresponding to the symbol 54c recognize which character the symbol 54c corresponds to. In addition, limiting the time period to a few seconds can reduce the risk that the corresponding character 52c is read surreptitiously by a third party.

The predetermined gesture is not limited to double-tapping, but can be long-pressing and pinching-out on the symbols 54a to 54e. The time period for showing the characters can be of course set to any length.

In the above-described embodiment, the password entry field 55b may be divided into a plurality of cells and may allow the symbols 54a to 54e corresponding to the characters 52a to 52e that make up the password to be input in a different order. Specifically, the password-entry acceptance unit 46 may accept the entry of the password that is input by dragging and dropping the characters 52a to 52e in a different order from the order of the characters 52a to 52e in the password.

Figure 9:
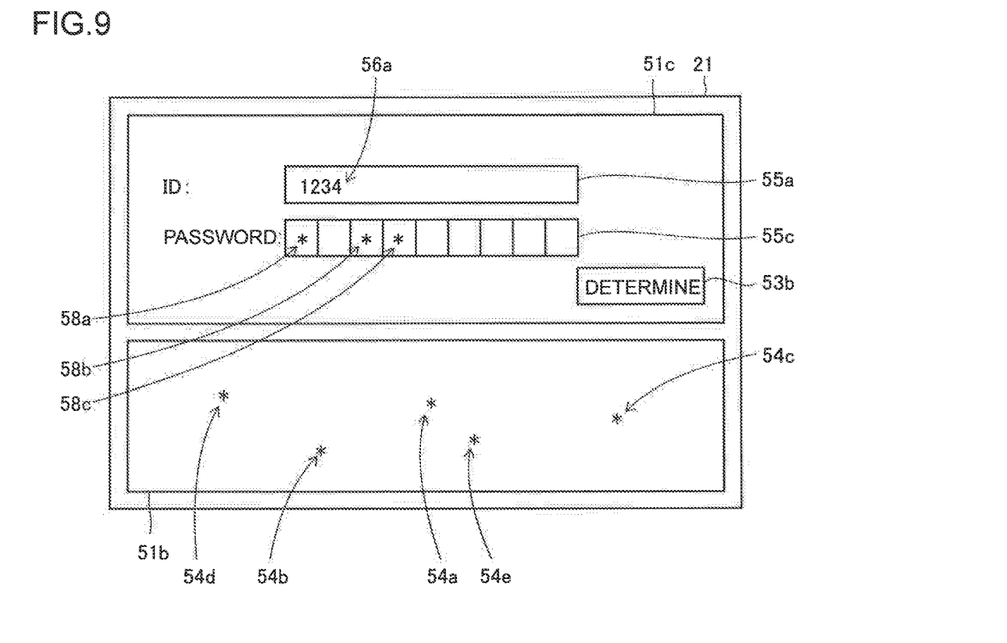
FIG. 9 shows an exemplary screen of the touch panel with symbols corresponding to the characters that make up the password arranged in a different input order.

FIG. 9 shows an exemplary screen of the touch panel 21 when the symbols 54a to 54e corresponding to the characters 52a to 52e that make up the password are input in a different order. Referring to FIG. 9, a password entry field 55c includes a plurality of cells, in this example, nine cells. The user inputs the five characters that make up the password into the cells in a different order. In this example shown in FIG. 9, the symbols 58a, 58b, 58c corresponding to the password characters are input in the first cell, third cell, and fourth cell from the left, respectively. This configuration can further improve security. It is also possible to make up a password including an empty cell, which further improves security. The cells may be defined not only by the lines as drawn in FIG. 9, but also other types of lines or invisible lines.

In the above-described embodiment, the symbols 54a to 54e associated with the characters 52a to 52e, respectively, in the second area 51b in the second style are all the same asterisk symbols; however, the embodiment is not limited thereto, and the symbols corresponding to the characters 52a to 52e all can be different from one another.

Figure 10:
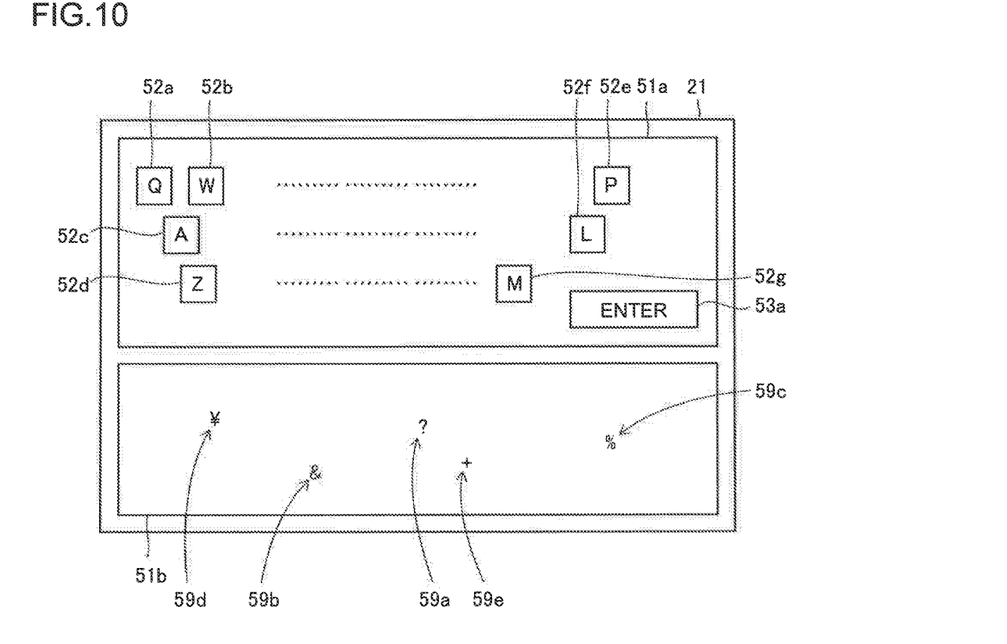
FIG. 10 shows an exemplary screen of the touch panel with different symbols corresponding to the characters, respectively, displayed.

FIG. 10 shows an exemplary screen of the touch panel 21 with symbols different for each of the characters 52a to 52e displayed. Referring to FIG. 10, the touch panel 21 displays symbol 59a, 59b, 59c, 59d, 59e in the second area 51b. The symbol 59a is a symbol shaped as "? (question mark)". The symbol 59b is a symbol shaped as "& (ampersand)". The symbol 59c is a symbol shaped as "% (percent)". The symbol 59d is a symbol shaped as "¥ (yen sign)". The symbol 59e is a symbol shaped as "+ (plus)". The symbols can be configured as described above. This configuration makes it easy for the user who entered the password to remember the symbols 59a to 59e, because the user can associate with the symbols 59a to 59e with the characters 52a to 52e that make up the password, respectively. Of course, this example prevents a third party who takes a surreptitious glance at the symbols 59a to 59e from figuring out the characters 52a to 52e that make up the password.

Although the password-entry acceptance unit 46 in the above-described embodiment is configured to accept the password that is input by dragging and dropping the symbols 54a to 54e from the second area 51b to the third area 51c, the embodiment is not limited thereto, and the password-entry acceptance unit 46 can be configured to accept the password that is input by selecting the symbols 54a to 54e displayed in the second area 51b in the second style in the order in which the symbols 54a to 54e are tapped. This configuration is simple and can still improve security upon entry of the password. In this case, the third area 51c may not be displayed if unnecessary. Alternatively, the password entry field 55b can be hidden.

In addition, the password-entry acceptance unit 46 in the above-described embodiment can be configured to accept the entry of the password even if the number of the symbols 54a to 54e displayed in the second style by the second display control unit 45 is different from the number of the characters 52a to 52e to be accepted. Specifically, the user selects the characters displayed in the first area 51a more in number than the characters that make up the actual password so that the number of the symbols to be displayed in the second area 51b in the second style surpasses the number of the characters in the password to provide camouflage. Then the user picks up only the symbols corresponding to the characters that make up the password to enter the password. This can further improve security.

In the above-described embodiment, the first area 51a, second area 51b, and third area 51c all can be displayed together on the touch panel 21. The ID can be omitted. In other words, the multifunctional peripheral 11 can determine the availability of the operation unit 13, the operable level, or other conditions through only password authentication. In addition, the second style is not limited to the representation of symbols, and other types of characters, simple numbers, figures or the like can be used for the second style. Alternatively, a single alphabet letter can be used for the second style.

In the above-described embodiment, the password entry device 41 can be configured to include a password authentication unit 23 that authenticates passwords accepted by the password-entry acceptance unit 46.

A multifunction peripheral 11 corresponding to the image processing apparatus according to the disclosure is configured as described below. Specifically, the multifunction peripheral 11 performs image processing. The multifunction peripheral 11 includes an image forming unit 15 serving as an image processing unit for processing images, a password entry device 41 through which a password is input, a password authentication unit 23, and an operation unit 13. The password authentication unit 23 authenticates a password input into the password entry device 41. If password authentication is successfully done by the password authentication unit 23, the operation unit 13 permits the entry of information relating to image processing. The password entry device 41 includes a touch panel 21 that displays information, a first display control unit 43, a tap determination unit 44, a second display control unit 45, and a password-entry acceptance unit 46. The first display control unit 43 performs control operations to display a plurality of characters including characters that make up a password in a first area of the touch panel 21 in a first style for representing characters. The tap determination unit 44 determines which of the characters displayed in the first style by the first display control unit 43 have been tapped. The second display control unit 45 performs control operations to display the characters determined that they were tapped by the tap determination unit 44 in a second area 51b, which differs from the first area of the touch panel, in the second style, which differs from the first style. The password-entry acceptance unit 46 accepts the entry of the characters that make up the password with the characters displayed in the second style by the second display control unit 45.

Although the password entry device 41 in the above-described embodiment is configured to be placed in the multifunction peripheral 11, the embodiment is not limited thereto, and the password entry device 41 is applicable to any electronic devices employing a password authentication mechanism requiring password entry, such as information processing apparatuses including computers, smart phones, and mobile terminals including tablet PCs.

It should be understood that the embodiments disclosed herein are illustrative and non-restrictive in every respect. The scope of the present disclosure is defined by the terms of the claims, rather than by the foregoing description, and is intended to include any modifications within the scope and meaning equivalent to the terms of the claims.

The password entry device and image processing apparatus according to the present disclosure can be effectively used especially to meet a demand for improved security upon entry of passwords.

What is claimed is:

1. A password entry device through which a password is entered, comprising:
   a touch panel displaying information;
   a first display control unit performing control operations to display a plurality of characters including characters that make up the password in a first area of the touch panel in a first style for representing characters;
   a tap determination unit determining which of the characters displayed in the first style by the first display control unit have been tapped;
   a second display control unit performing control operations to display the characters, which are determined by the tap determination unit that they were tapped, in a second area, which differs from the first area of the touch panel, in a second style, which differs from the first style;
   a password-entry acceptance unit accepting the entry of the characters that make up the password with the characters displayed in the second style by the second display control unit; and
   wherein the second display control unit performs control operations to display the characters, which are represented in the second style, in the first style for a predetermined period of time, when the tap determination unit determines the characters displayed in the second style are tapped with a pre-determined gesture.

2. The password entry device according to claim 1, wherein
   the password-entry acceptance unit accepts the entry of the password that is input by selecting the characters displayed in the second area in the second style in the order in which the characters are pressed.

3. The password entry device according to claim 1, further comprising
   a third display control unit performing control operations to display a third area on the touch panel, the third area displaying the characters that are selected from the characters displayed in the second style and make up the password, wherein
   the password-entry acceptance unit accepts the entry of the password that is input by dragging and dropping the characters from the second area to the third area.

4. The password entry device according to claim 3, wherein
   the password-entry acceptance unit accepts the entry of the password that is input by dragging and dropping the characters in a different order from the order of the characters in the password.

5. The password entry device according to claim 1, wherein
   the predetermined gesture includes double-clicking the characters.

6. The password entry device according to claim 1, wherein
   the second display control unit performs control operations to display all the characters as the same symbols in the second style.

7. The password entry device according to claim 1, wherein
   the password-entry acceptance unit accepts the entry of the password even if the number of the characters displayed in the second style by the second display control unit is different from the number of the characters to be accepted.

8. The password entry device according to claim 1, further comprising
   a password authentication unit authenticating passwords entered through the password-entry acceptance unit.

9. An image processing apparatus that performs image processing, comprising:
   an image processing unit performing image processing;
   a password entry device through which a password is entered;
   a password authentication unit authenticating the password input into the password entry device; and
   an operation unit permitting input of information relating to image processing if the password authentication by the password authentication unit succeeds, wherein
   the password input device includes
   a touch panel displaying information,
   a first display control unit performing control operations to display a plurality of characters including characters that make up the password in a first area of the touch panel in a first style for representing characters,
   a tap determination unit determining which of the characters displayed in the first style by the first display control unit have been tapped,
   a second display control unit performing control operations to display the characters, which are determined by the tap determination unit that they were tapped, in a second area, which differs from the first area of the touch panel, in a second style, which differs from the first style, a password-entry acceptance unit accepting the entry of the characters that make up the password with the characters displayed in the second style by the second display control unit; and wherein the second display control unit performs control operations to display the characters, which are represented in the second style, in the first style for a predetermined period of time, when the tap determination unit determines the characters displayed in the second style are tapped with a pre-determined gesture.

* * * * *